United States Patent [19]

Fischer et al.

[11] Patent Number: 4,649,080
[45] Date of Patent: Mar. 10, 1987

[54] FIBER-REINFORCED MATERIALS

[75] Inventors: Juergen Fischer, Ludwigshafen; Hartmut Zeiner, Plankstadt; Dietmar Nissen, Heidelberg; Gerhard Heinz, Weisenheim; Peter Neumann, Wiesloch, all of Fed. Rep. of Germany

[73] Assignee: BASF Aktiengesellschaft, Fed. Rep. of Germany

[21] Appl. No.: 731,719

[22] Filed: May 8, 1985

[30] Foreign Application Priority Data

May 8, 1984 [DE] Fed. Rep. of Germany ....... 3416855
Jan. 11, 1985 [DE] Fed. Rep. of Germany ....... 3500707

[51] Int. Cl.$^4$ .......... B05D 3/02; B29C 67/00; B32B 27/06; C08K 7/02
[52] U.S. Cl. .................. 428/419; 264/137; 264/258; 427/195; 427/389.8; 427/389.9; 523/222
[58] Field of Search ........... 427/389.8, 389.9, 195; 428/268, 267, 392, 395, 419; 523/222; 264/137, 257, 258, 324, 347

[56] References Cited

U.S. PATENT DOCUMENTS

| | | | |
|---|---|---|---|
| 3,784,504 | 1/1974 | Feasey | 528/125 X |
| 3,839,287 | 10/1974 | Kwiatkowski et al. | 528/183 X |
| 4,304,896 | 12/1981 | Keller et al. | 528/9 |
| 4,417,039 | 11/1983 | Reinhardt et al. | 528/125 X |
| 4,477,496 | 10/1984 | Das et al. | 427/389.8 X |
| 4,486,373 | 12/1984 | Kurauchi et al. | 264/137 X |
| 4,489,027 | 12/1984 | St. Clair et al. | 264/137 |

FOREIGN PATENT DOCUMENTS 157732 10/1985 European Pat. Off. .

Primary Examiner—Michael R. Lusignan
Attorney, Agent, or Firm—Keil & Weinkauf

[57] ABSTRACT

Fiber-reinforced materials are produced by a process in which a heat-stable thermoplastic aromatic polyether A which contains reactive groups, preferably nitrile groups and/or sulfur bridges and/or arylthio or alkylthio groups, if necessary together with a heat-stable thermoplastic polymer B which does not contain any reactive groups, is applied onto reinforcing fibers, the resulting semi-finished product is molded and, in the molding obtained, the plastic matrix is crosslinked so that the glass transition temperature increases and it becomes virtually insoluble.

20 Claims, No Drawings

FIBER-REINFORCED MATERIALS

The present invention relates to moldings which consist of heat-stable plastics reinforced with oriented fibers, and a process for the preparation of such fiber-reinforced materials by applying the plastics onto reinforcing fibers.

The matrix materials used to date for the preparation of high performance reinforced materials have been virtually exclusively epoxy reins. Owing to their low viscosities, these resins have the advantage of being able to impregnate the reinforcing fibers thoroughly, but they have the disadvantage that semi-finished products produced from them do not have an unlimited shelf life, and shaping and curing have to be carried out simultaneously. This disadvantage is not encountered when heat-stable thermoplastics are used as matrix material; in this case, however, other problems arise. If soluble, amorphous thermoplastics, eg. polysulfones or polyether-sulfones, are used, the resulting moldings are sensitive to stress cracking owing to the solubility of the matrix material in organic solvents; in particular, this prevents the moldings from being used in the automotive sector. When an attempt is made to apply insoluble, partially crystalline thermoplastics, such as polyether-ketones or polysulfide-ketones, as a melt onto reinforcing fibers, the result is that the wetting of the fibers is too low because of the high viscosity of the melt.

EP-A-56 703 proposes impregnating fiber structures with melts of low molecular weight, and low viscosity thermoplastic polymers. However, the resulting fiber-reinforced materials, particularly in the case of partially crystalline thermoplastics, exhibit unsatisfactory toughness and expansion characteristics. Although EP-A-56 703 indicates the possibility of subsequently increasing the molecular weight, the methods recommended (solid-phase condensation, addition of crosslinking agents and irradiation) lead to uncontrollable and undesirable side reactions for the polymers described therein and hence adversely affect the mechanical properties of the manufactured articles. Furthermore, they require very expensive apparatus.

It is an object of the present invention to prepare fiber-reinforced materials which are very tough and possess good heat distortion resistance and resistance to solvents and to stress cracking.

We have found that this object is achieved, in accordance with the invention, if a crosslinkable thermoplastic aromatic polyether A which contains reactive groups and has a glass transition temperature above 80° C. is applied, if necessary together with a polymer B which does not contain any reactive groups and has a glass transition temperature above 80° C., onto reinforcing fibers, the resulting semi-finished product is molded, and, in the molding obtained, the plastic matrix is crosslinked so that the glass transition temperature of the molding is at least 20° C. higher than that of the uncrosslinked plastic matrix, and the matrix is virtually insoluble in low-boiling chlorohydrocarbons.

For the purposes of the present invention, polymers are those having a degree of polymerization of not less than 5, preferably not less than 10, in particular not less than 20.

Preferred crosslinkable polymers A are aromatic polyethers which carry nitrile groups and/or sulfur bridges and/or arylthio or alkylthio groups. Arylthio is —S—R, where R is unsubstituted or substituted aryl, eg. phenyl, naphthyl or pyridyl, which can carry, for example, halogen, aryl or alkyl substituents; alkylthio is —S—R', where R' is alkyl of 1 to 6 carbon atoms.

The stated groups can improve the solubility of the polyethers A in organic solvents on the one hand, and can initiate the crosslinking reaction on the other hand. In the crosslinking reaction, covalent bonds are formed.

Furthermore, the solubility of polyethers A can be improved by the presence of heterocyclic groups, eg. —N=, in the polymer molecule, or by meta bonding of the individual members within the polymer chain.

The following groups may furthermore act as reactive groups capable of initiating a crosslinking reaction:

—NC
—NCO
—NCS
—SCN
—OCN
—C≡CR, —CR=CR$_2$

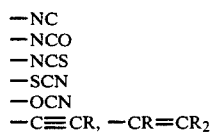

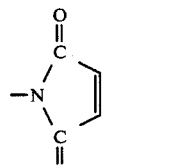

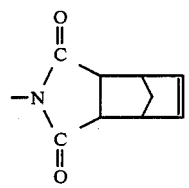

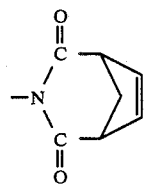

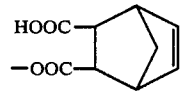

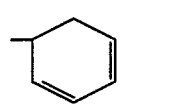

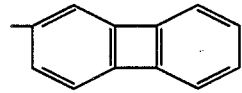

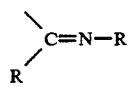

—S—S—R
—NO

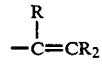

-continued

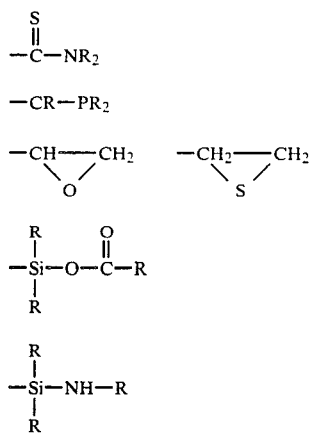

And the following groups in the polymer chain:

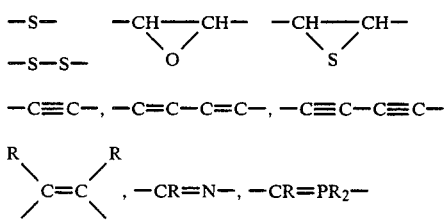

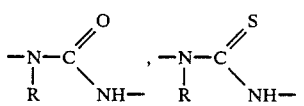

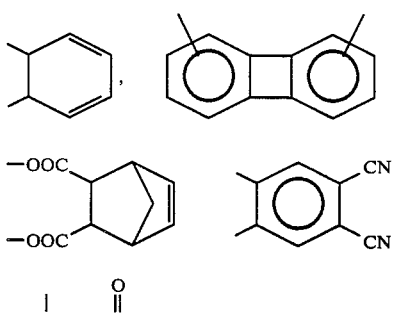

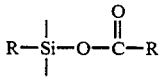

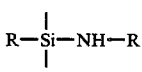

In all these formulae, R is hydrogen or aryl.

In some cases it is also possible for alkyl radicals and halogen substituents to act as reactive groups.

Because of the presence of the reactive groups in the polymer A, it is not necessary to add chemical cross-linking agents during the novel process.

Examples of suitable aromatic polyethers A are those which contain sulfur bridges as the only reactive groups, for example polycondensates of 4,4′-thiodiphenol and activated dihaloaromatics, eg. dichlorodiphenyl sulfone or dichlorodiphenyl ketone, and the corresponding copolyethers in which some of the thiodiphenol is replaced with other bisphenols.

Particularly preferred compounds are aromatic polyethers A of the general formula —X—O—Y—O—, where X is aryl which carries one or more nitrile and/or arylthio groups, and Y is a diphenol radical, preferably the bisphenol S radical

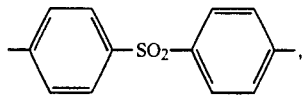

the bisphenol T radical

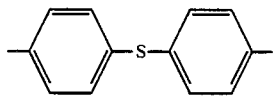

or the bisphenol A radical

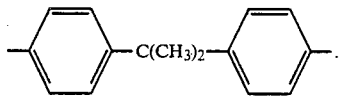

In addition, the radicals of the following diphenols are also suitable:

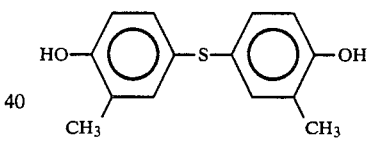

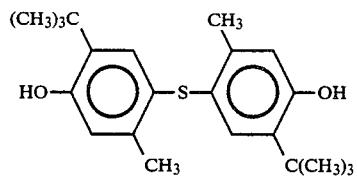

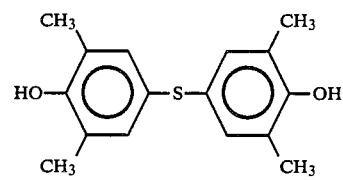

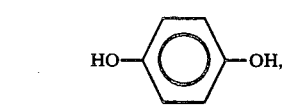

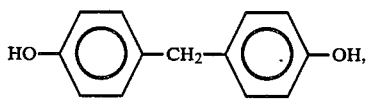

-continued
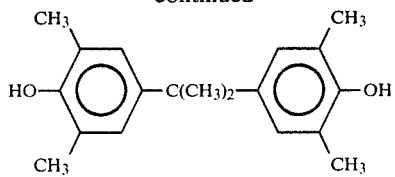
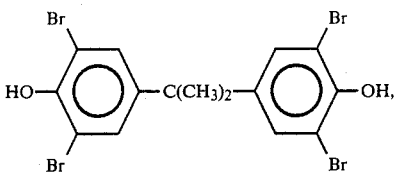
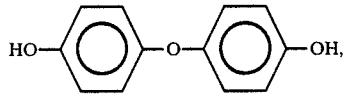
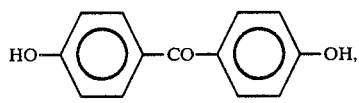
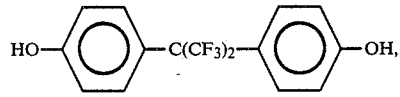
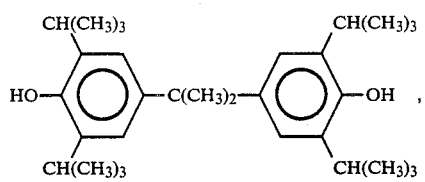
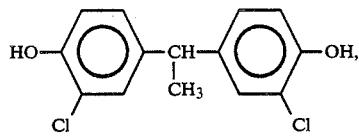
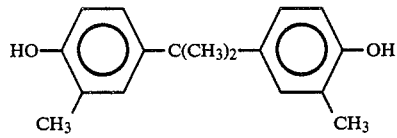
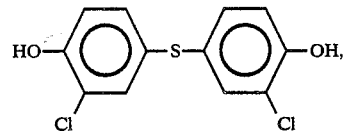
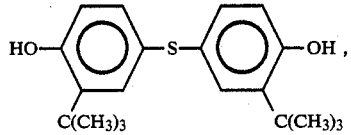
-continued
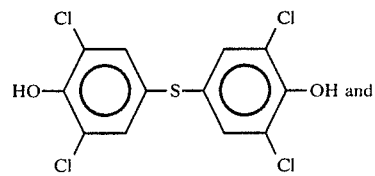
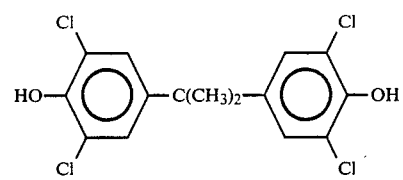
Examples of suitable aryl radicals X are:
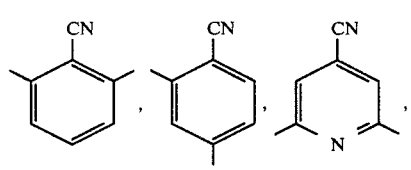
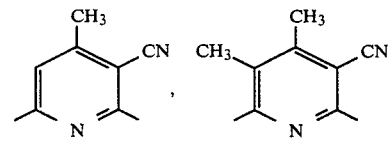
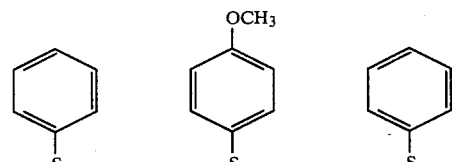
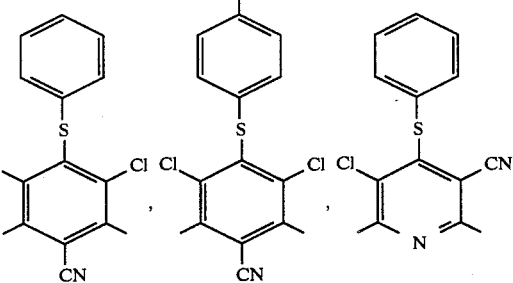
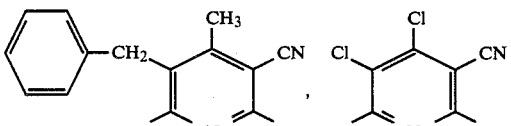
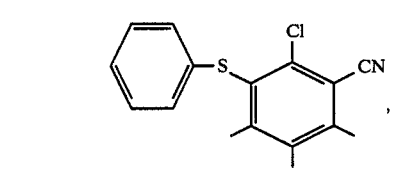
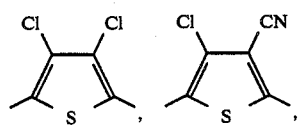

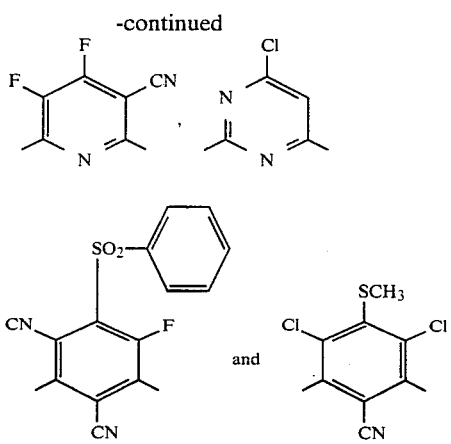

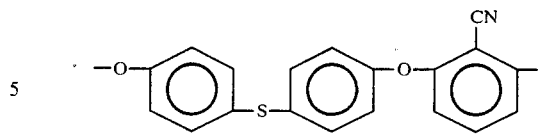

and

B. from 98 to 50 parts by weight of a polyether-sulfone or polysulfone.

Suitable reinforcing fibers are conventional continuous filaments (rovings), for example those consisting of glass, carbon or aromatic polyamides (®Aramid fibers). They can be used in the form of individual rovings, laid webs of parallel fibers, or woven fabrics. The volume ratio of plastic to reinforcing fibers is preferably from 70:30 to 15:85, in particular from 55:45 to 35:65.

In a preferred preparation process, the reinforcing fibers are impregnated with a solution of the thermoplastic polymers, the preferred solvents being low-boiling organic liquids, in particular chlorohydrocarbons having a boiling point below 80° C.

Dichloromethane, and a mixture of dichloromethane with chloroform in a volume ratio of about 1:1, are particularly suitable. Other suitable solvents include trichloroethane, chloroform, hexafluorobenzene, aliphatic fluorohydrocarbons and higher chlorohydrocarbons. In principle it is also possible to use high-boiling solvents, eg. dimethylformamide or N-methylpyrrolidone. However, these solvents are difficult to remove from the semi-finished product. Preferably, impregnation is carried out using from 5 to 40, in particular from 10 to 30, % strength by weight solutions. The solutions should have a viscosity of less than 10,000, preferably less than 5,000, in particular from 50 to 1,000, mPa.s. During impregnation, the rovings are drawn through the solvent bath individually or side by side in the form of a band. The rovings should be very well spread out, ie. pulled apart to form a sheet-like structure; this can be effected by a conventional apparatus.

It is also possible to use mixtures of two or more different polymers A, as well as copolymers which contain different monomer building blocks X and Y.

The polymer A is a heat-stable plastic, ie. its glass transition temperature is above 80° C., preferably above 100° C., in particular above 130° C.

In the novel process, it is possible to apply either just the polyether A alone onto the reinforcing fibers, or to apply a mixture of the polymer A with a heat-stable thermoplastic polymer B which does not contain any reactive groups and likewise has a glass transition temperature above 80° C., preferably above 100° C., in particular above 130° C. The polymers B are preferably amorphous, and soluble in organic solvents.

Polyether sulfones

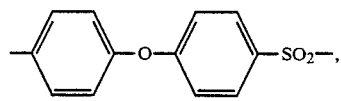

polysulfones

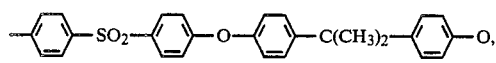

polyetherimides, eg.

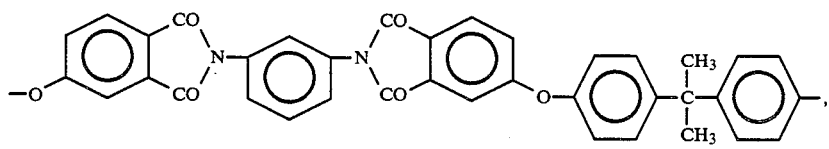

polycarbonates, aromatic polyethers and aromatic polyesters are preferred.

The polymers A and B are employed in a weight ratio of from 100:0 to 1:99. Although the polymers B do not themselves contain any reactive groups, they are incorporated in the crosslinked structure during the crosslinking reaction so that they are virtually insoluble and are no longer susceptible to stress cracking. This is the case in particular for mixtures consisting of A. from 2 to 50 parts by weight of the aromatic polyether of the formula The fiber content of the impregnated rovings can be influenced by the concentration of the impregnating solution and the residence time in the bath, and by means or a pair of squeeze rolls downstream of the impregnating bath. After the impregnating bath, the impregnated rovings pass through a drying zone where the solvents are evaporated, preferably at above 60° C., in particular at from 80° to 150° C.

The impregnated, synthetic resin-bonded prepreg rovings, in the form of individual filaments or of 0.5–2 cm wide bands, can be wound tack-free onto bobbins. They constitute a semi-finished product which has a long shelf life and can be further processed by a thermoplastic method. For example, they can be passed through a preheating zone and then wound onto cores, if necessary even directly after the impregnation and drying process; on the cores, they can be bonded by heating at from 160° to 300° C., and in this manner rotationally symmetrical moldings, eg. pipes, can be produced.

Furthermore, the impregnated roving can be positioned directly on a core and the solvent removed afterward.

Sheet-like prepregs can be produced if a large number of rovings are passed parallel through the impregnating bath, and the resulting impregnated roving band which is bonded by synthetic resin and is preferably from 2 to 150 cm wide is dried and then cut into sheet-like pieces or wound continuously onto bobbins.

These unidirectionally fiber-reinforced prepregs, which are preferably from 0.1 to 0.5 mm thick, can be stacked one on top of the other in layers, and the individual prepregs can be positioned at any angle to one another. The stacks can then be molded to finished components by pressing, preferably at above the softening range of the polymers. To do this, the stack is heated up, for example outside the press, and is then introduced into the press, which is kept at a temperature below the glass transition temperature of the polymer.

It is also possible to impregnate woven fabrics with solutions of the polymers. Evaporating off the solvent gives sheet-like semi-finished products, which can be further processed as described above.

Finally, in the resulting moldings, the plastic matrix is crosslinked so that the glass transition temperature increases by not less than 20° C., preferably by not less than 50° C., to above 100° C., preferably above 180° C. In the non-crosslinked state, the glass transition temperature measured on the fiber-containing composite is the same as the glass transition temperature of the plastic matrix; in the crosslinked state, the glass transition temperature can only be measured on the reinforced material, and it is possible that there is also a contribution from the reinforcing fibers, in addition to that from the crosslinked plastic matrix.

Another effect of crosslinking is that the fiber-reinforced material is virtually insoluble in low-boiling chlorohydrocarbons. However, it is possible that, in the case of a large excess of polymer B, not all of this polymer is completely crosslinked. However, the amount of soluble plastic (as measured by extraction for 1 hour with dichloromethane at 35° C.) must be less than 5%, preferably less than 1%.

Crosslinking of the plastic matrix is advantageously carried out by heating the moldings in the presence or absence of a crosslinking catalyst. Particularly suitable crosslinking catalysts are Lewis acids, eg. zinc chloride or aluminum chloride, these being mixed with the polymers in amounts of, preferably, from 0.5 to 5% by weight, as well as metal oxides, eg. alumina and iron(II) oxide, diphenyl disulfide and thiophosphates. Preferably, the moldings are heated for not less than 5 minutes, in particular from 1 to 10 hours, at above 200° C., in particular from 250° to 450° C.

This gives infusible, solvent-resistant moldings which still have good mechanical properties even at elevated temperatures, eg. 300° C. After crosslinking, the finished articles are stable to the solvents previously used, ie. chlorohydrocarbons.

In another preferred process, the reinforcing fibers are impregnated with a melt of the thermoplastic polymers. This melt should have a very low viscosity, ie. less than 100,000, preferably less than 20,000, in particular from 1,000 to 10,000, mPa.s.

This process preferably employs crosslinkable thermoplastic polyethers A which carry nitrile and/or arylthio or alkylthio groups and have a glass transition temperature above 80° C. They can be mixed with thermoplastic polymers B which do not carry any reactive side groups, not only the amorphous polysulfones and polyether-sulfones but also partially crystalline and hence insoluble heat-stable polymers, such as polyetherketones, polyphenylene sulfides, polysulfide-ketones or nylons, being suitable. The process steps of impregnation, molding and crosslinking are as described above.

In another process, plastic powder consisting of polyether A and, if required, polymer B is applied onto reinforcing fibers. The powder preferably has a mean particle size of from 5 to 15 $\mu$m. In this procedure, rovings which have been very well spread out by blowing with air or by means of another conventional apparatus are preheated, and drawn through a fluidized bed containing the plastic powder. The latter is at a temperature just below the glass transition temperature or melting point. Thereafter, the plastic powder adhering to the reinforcing fibers is fused, the fibers being impregnated. This procedure is followed by the further process steps described above.

In another process, plastic fibers consisting of polyether A and, if required, polymer B are used as the starting material and woven fabrics are produced from these fibers and reinforcing fibers, for example one type of fiber being warp threads and the other type weft threads. The plastic fibers are fused during the shaping process, and the resulting semi-finished products are further processed as described above.

Finally, it is also possible to start from a plastic film of polyether A and, if required, polymer B, and to drape such films one on top of the other in one or more layers together with sheet-like structures of reinforcing fibers. The layers are then pressed at above the melting range of the plastics, and the resulting semi-finished product is further processed in the manner described above.

The present invention furthermore relates to fiber-reinforced materials containing a heat-stable thermoplastic polyether A which carries reactive groups, if necessary together with a heat-stable thermoplastic polymer B which does not carry any reactive groups, and from 30 to 80% by volume of oriented reinforcing fibers, wherein the plastic matrix is crosslinked via the reactive groups so that the fiber-reinforced material has a glass transition temperature greater than 100° C., preferably greater than 130° C., in particular greater than 180° C., and is virtually insoluble in low-boiling chlorohydrocarbons.

Such fiber-reinforced materials, which are very tough and possess good heat distortion resistance and resistance to solvents and to stress cracking, are used as automotive components and in the aviation and space flight industries.

In the Examples which follow, parts and percentages are by weight.

EXAMPLES (a) Preparation of the Polyether A 1

54.57 g (0.25 mole) of 4,4'-thiodiphenol and 43.0 g (0.25 mole) of 2,6-dichlorobenzonitrile are dissolved in 420 ml of N-methylpyrrolidone and 190 ml of toluene, and 35.88 g (0.26 mole) of anhydrous potassium carbonate are added. The reaction mixture is heated to 150° C. in the course of 2 hours, an azeotropic mixture of water and toluene being distilled off continuously. When removal of the toluene is complete, the temperature is increased to 180° C. and the reaction mixture is left at this temperature for 5 hours. The polycondensation is terminated by passing in a stream of methyl chloride for 30 minutes.

300 ml of chlorobenzene are added, the inorganic constituents are filtered off and the polymer is precipitated in a mixture consisting of equal amounts of 1% strength acetic acid and methanol, washed carefully with water and methanol, and dried for 12 hours at 100° C. under reduced pressure. The polymer has an intrinsic viscosity $$[\eta]_{NMP}^{25°\,C.} = 0.59\ dl.g^{-1},$$

a glass transition temperature Tg of 153° C. and a K value of 52.

(b) Preparation of the Polyether A 2

0.25 mole of 4,4'-thiodiphenol and 0.25 mole of 2,5-dichloro-3-cyano-4-methylpyridine are subjected to a polycondensation reaction as described under (a), except that the reaction temperature is 150° C.

The resulting polymer A 2

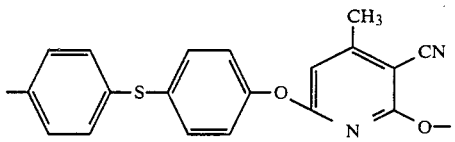

has a glass transition temperature of 154° C., a reduced viscosity $$[\eta]_{NMP}^{25°\,C.}\ \text{von}\ 0,21\ dl.g^{-1}$$

and a K value of 29.

(c) Preparation of the Copolyether A 3

The procedure described under (b) is followed except that 0.125 mole of 2,6-dichlorobenzonitrile and 0.125 mole of 2,5-dichloro-3-cyano-4-methylpyridine are used. The resulting copolymer A 3 has a glass transition temperature Tg of 148° C. and a K value of 26.

(d) Preparation of the Polyether A 4

0.25 mole of 4,4'-thiodiphenol and 0.25 mole of dichlorodiphenyl sulfone are dissolved in 420 ml of N-methylpyrrolidone and 190 ml of toluene, and 0.26 mole of anhydrous potassium carbonate is added. The reaction mixture is heated to 150° C. in the course of 2½ hours, an azeotropic mixture of water and toluene being distilled off continuously. When removal of the toluene is complete, the temperature is increased to 180° C. and the reaction mixture is left at this temperature for 12 hours. The polycondensation is terminated by passing in a stream of methyl chloride for 30 minutes.

300 ml of chlorobenzene are added, the inorganic constitutes are filtered off and the polymer is precipitated in a mixture consisting of equal amounts of 1% strength acetic acid and methanol, washed carefully with water and methanol, and dried for 12 hours at 100° C. under reduced pressure. The glass transition temperature of the resulting polyetherthioethersulfone is 165° C., and the solution viscosity $$[\eta]_{NMP}^{25°\,C.}\ 1,05\ dl.g^{-1}.$$

(c) Preparation of the Copolyether A 5

A mixture of 0.125 mole of bisphenol A, 0.125 mole of 4,4'-thiodiphenol and 0.25 mole of 4,4'-dichlorodiphenyl sulfone is dissolved in 600 ml of N-methylpyrrolidone and 250 ml of toluene under an inert gas, and 0.26 mole of potassium carbonate is added. The further procedure is as described in (d), and the resulting copolymer has a glass transition temperature of 175° C.

EXAMPLE 1

A 20% strength solution of the polyether A 1 in CH$_2$Cl$_2$, having a viscosity of 800 mPa.s at room temperature, is used for impregnating glass fibers (1200 tex roving from Gevetex).

A plurality of fibers are drawn parallel through a bath containing the polymer solution, after which the solvent is stripped off at 80°–130° C. to give sheet-like, unidirectionally reinforced prepregs which are still thermoplastic. Four of these prepregs in each case are draped one on top of the other so that all the fibers lie parallel. The laid web is heated in a press at 300° C. and under slight pressure for about 1 hour, after which the temperature is increased to 400° C. The entire curing process lasts about 7 hours. However, after only 1–2 hours under the press, the partially crosslinked sheet can be transferred to an oven at 340°–400° C. for 8–15 hours in order to complete the crosslinking.

The ready-prepared sheet is metallic black, whereas the prepreg laid web is virtually colorless. The crosslinked sheet is resistant to CH$_2$Cl$_2$, and the glass transition temperature Tg has increased to 300° C.

The shear modulus is 5,000 N/mm$^2$ at 20° C., but decreases to 4,000 N/mm$^2$ at 200° C. and to only 3,000 N/mm$^2$ at 300° C. The fiber content is 75% by volume.

EXAMPLE 2

The procedure described in Example 1 is followed, except that only one glass fiber roving is impregnated.

After passing through the drying zone, the impregnated prepreg roving is wound onto a bobbin. It contains 70% by volume of glass fibers and constitutes a semifinished product with a long shelf life.

The prepreg roving is laid on a cylindrical mandrel heated at about 200° C., on a conventional winding machine, the layers being laid in the following pattern: 90°/90°+45°/−45°/−45°/+45°/90°/90°. The diameter of the mandrel is 70 mm, and the pipe is 100 mm long. When winding is complete, the pipe is crosslinked for 20 hours in an oven at 350°–400° C. to give the finished article.

EXAMPLE 3

A 20% strength solution, in CH$_2$Cl$_2$, of equal amounts of the polyether A 1 and a polyether-sulfone having a glass transition temperature of 220° C. is prepared, the viscosity of the solution at room temperature being 800 mPa.s. This solution is used to impregnate glass fibers (1200 tex roving from Gevetex). To do this, a plurality of fibers are drawn parallel through a bath containing the polymer solution, after which the solvent is stripped off at 80°–130° C. to give sheet-like, unidirectionally reinforced prepregs.

Four such prepregs are draped one on top of the other with all fibers running parallel. The laid web is heated in a through-circulation oven for 2 hours at 350° C., after which the sheet is heated in a press at 350° C. for 2 hours. The partially crosslinked sheet is then further crosslinked in a through-circulation oven for 12 hours at 350° C.

The ready-prepared sheet is metallic black, whereas the prepreg is virtually colorless. The glass transition temperature Tg is 280° C., and the shear modulus is 4,500 N.mm$^{-2}$ at 20° C., but decreases to 3,900 N.mm$^{-2}$ at 200° C. and to only 3,000 N.mm$^{-2}$ at 300° C. The fiber content is 65% by volume.

An extraction test with $CH_2Cl_2$ shows that the plastic matrix has become virtually insoluble, ie. that the polyether sulfone, too, has undergone crosslinking.

EXAMPLE 4

A 100 cm wide glass fabric having a weight per unit area of 280 g.m$^{-2}$ is impregnated with a 20% strength solution of the polyether A 2 in $CH_2Cl_2$ by passing it continuously through an impregnating bath. The said fabric then passes through a vertical drying tower, the solvent being evaporated off at 130°–150° C. The resulting fabric prepreg is cut into lengths of 1 m and stored as a semi-finished product.

16 fabric prepregs are laid one on top of the other in a press, and pressed at 340° C. and under 10 bar for 4 hours. The finished molding is further crosslinked in a through-circulation oven at 340° C. for 10 hours.

The resulting sheet is resistant for $CH_2Cl_2$, and crosslinking has increased the glass transition temperature Tg from 150° C. to 300° C.

EXAMPLE 5

A 30% strength solution of the copolyether A 3 in $CH_2Cl_2$ is prepared, the solution having a viscosity of 60 mPas at room temperature. 100 carbon fibers (T 300 from TORAY) are drawn parallel through this solution at a speed of 5 m.min$^{-1}$, and the solvent is then evaporated off at from 130° to 180° C. to give a sheet-like, undirectionally reinforced thermoplastic prepreg 300 mm wide. 100 cm long pieces are cut off from this prepreg. 8 such pieces are stacked one on top of the other so that all fibers are oriented parallel. The laid web is cured in a press at 320° C. and under 10 bar for 10 hours to give a test sheet having a fiber content of 60% by volume. The sheet is then heated for a further 12 hours at 320° C. It is resistant to solvents, and the glass transition temperature has increased from 148° to 260° C.

EXAMPLE 6

20 carbon fiber rovings (T 300 from TORAY) are well spread out and then drawn through a bath containing a melt of the polyether A 1, at a speed of 0.5 m.s.$^{-1}$. The bath temperature is 280° C. After cooling, the 6 cm wide prepreg band is wound onto a bobbin. It constitutes a thermoplastic semi-finished product which has a long shelf life and, if required, can be shaped to finished articles and crosslinked at elevated temperatures. This makes the plastic matrix insoluble in $CH_2Cl_2$, and the glass transition temperature Tg increases from 153° to 250°–350° C. depending on the crosslinking conditions.

A 30% strength solution of the copolymer A 4 in methylene chloride, having a viscosity of 400 mPa.s at room temperature, is used for impregnating a glass fiber fabric (92 115 from Interglas). The fabric is drawn through an impregnating bath, and the solvent is evaporated off to give a sheet-like semi-finished product. A plurality of layers of this semi-finished product are draped one on top of the other and laid in a platen press die, and the laid web is heated at 320° C. for 6 hours. The resulting dark sheet is resistant to methylene chloride, and the glass transition temperature has increased to above 240° C. The fiber content of the laminate is 60% by volume, the strength in the fiber direction is not less than 300 N.mm$^{-2}$ and the modulus of elasticity is 28,000 N.mm$^{-2}$.

EXAMPLE 8

A glass fabric-reinforced finished article is produced from the copolyether A 5 in a manner similar to that described in Example 7. In this case, the glass transition temperature increases to 220° C. as a result of the crosslinking.

We claim:

1. A process for the production of moldings from a heat-stable plastic reinforced with oriented fibers, which comprises
   applying a crosslinkable thermoplastic aromatic polyether containing reactive sulfur groups and having a glass transition temperature above 80° C.
   onto reinforcing fibers to form a plastic matrix, molding the resulting semi-finished product, and thereafter crosslinking the plastic matrix so that the glass transition temperature of the molding is at least 20° C. higher than of the uncrosslinked plastic matrix, and the matrix is virtually insoluble in low-boiling chlorohydrocarbons.

2. A process for the production of moldings as set forth in claim 1, wherein the reinforcing fibers are impregnated with a plastic solution having a viscosity of less than 10,000 mPa.s.

3. A process as set forth in claim 2, wherein a 5–40% strength by weight solution in an organic solvent is used.

4. A process as claimed in claim 3, wherein the organic solvent is a chlorohydrocarbon having a boiling point below 80° C.

5. A process for the production of moldings as set forth in claim 1, wherein the reinforcing fibers are impregnated with a plastic melt having a viscosity of less than 100,000 mPa.s.

6. A process for the production of moldings as set forth in claim 1, wherein the thermoplastic polyether is applied in the form of a powder onto the reinforcing fibers and is fused.

7. A process for the production of moldings as set forth in claim 1, wherein a woven fabric based on reinforcing fibers and plastic fibers is produced, and the plastic fibers are fused.

8. A process for the production of moldings as set forth in claim 1, wherein one or more layers of a sheet-like structure of reinforcing fibers and one or more layers of plastic sheets are draped one on top of the other, the layers are pressed and the plastic sheets are fused.

9. A process as set forth in claim 1, wherein the aromatic polyether carries one or more nitrile groups and/or sulfur bridges and/or arylthio groups.

10. A process as set forth in claim 1, wherein the polymer B is a polyether-sulfone, a polysulfone, a polyether-imide, a polycarbonate, an aromatic polyether or an aromatic polyester.

11. A process as set forth in claim 1, wherein the polymers A and B are used in a weight ratio of from 100:0 to 1:99.

12. A process as set forth in claim 1, wherein the reinforcing fibers are used in the form of individual rovings, a laid web of parallel fibers, or a woven fabric.

13. A process as set forth in claim 1, wherein the volume ratio of plastic to reinforcing fibers is from 70:30 to 50:85.

14. A process as set forth in claim 1, wherein the crosslinking of the plastic matrix is carried out by heating in the presence or absence of a crosslinking catalyst, preferably a Lewis acid.

15. A process as set forth in claim 14, wherein the molding is heated at above 200° C. for not less than 5 minutes.

16. A fiber-reinforced material containing an effective amount of a heat-stable thermoplastic aromatic polyether which carries reactive sulfur groups, and from 30 to 85% by volume of oriented reinforcing fibers, wherein the plastic matrix is crosslinked via the reactive sulfur groups so that the fiber-reinforced material has a glass transition temperature of greater than 100° C. and is virtually insoluble in low-boiling chlorohydrocarbons.

17. The process of claim 1, wherein a second thermoplastic polymer is applied to the reinforcing fibers, said second thermoplastic polymer being free of reactive groups and having a glass transition temperature above 80° C.

18. The process of claim 1, wherein the polyether contains only sulfur as reactive groups.

19. The fiber-reinforced material of claim 16, wherein the polyether contains on sulfur as reactive groups.

20. The fiber-reinforced material of claim 16, wherein a second thermoplastic polymer is applied to the reinforcing fibers, said second thermoplastic polymer being free of reactive groups and having a glass transition temperature above 80° C.

* * * * *